INVENTOR.
LEONARD STANTON

Nov. 27, 1951  L. STANTON  2,576,892
TESTING APPARATUS

Filed July 30, 1949  2 SHEETS—SHEET 2

INVENTOR.
LEONARD STANTON
BY Arthur H. Swanson
ATTORNEY.

Patented Nov. 27, 1951

2,576,892

UNITED STATES PATENT OFFICE 2,576,892

TESTING APPARATUS

Leonard Stanton, Philadelphia, Pa., assignor to Minneapolis-Honeywell Regulator Company, Minneapolis, Minn., a corporation of Delaware Application July 30, 1949, Serial No. 107,705

1 Claim. (Cl. 175—183)

The general object of the present invention is to provide improved apparatus for testing a group of measuring circuits or elements one at a time in regular succession to detect and indicate the defective condition of each of the elements tested which is not in its normal effective condition. The invention was primarily devised and is especially adapted for use in industrial plants, such for example, as oil refineries and chemical plants, in which the leads from a plurality of measuring elements, and particularly thermocouples or thermocouple measuring circuits, are brought to a common control room or station in which they are connected to measuring or control apparatus. In accordance with the present invention, the leads or circuit portions so brought to a control room or station are there connected one at a time in regular succession, in each of regularly recurring testing cycles, to testing or scanning apparatus operative to determine whether each element is in a normal or abnormal condition when connected to the testing apparatus.

A major object of the invention is to provide simple and effective testing apparatus which is adapted to operate continuously so that each element in the group of elements tested, is tested at regular and suitably frequent intervals, and which includes indicating mechanism actuated, when any one of the elements tested is found to be defective, to identify said element and to thereafter maintain an indication of its defective condition until the element is repaired or replaced or given other appropriate attention, without interrupting the continuous operation of the testing mechanism.

The testing apparatus employed may take various forms. In testing thermocouple circuits of the usual character, for example, use may be made of practically any form of mechanism operative to rapidly determine whether each circuit tested does or does not have the relatively low impedance which is characteristic of the usual thermocouple circuit when intact, and also operative to actuate the associated indicating apparatus when the circuit impedance is not relatively low. However, in preferred forms of the present invention, the testing apparatus includes an electronic oscillator, and a specific object of the present invention is to provide novel circuit testing mechanisms including an electronic oscillator.

In one form illustrated herein, the oscillator arrangement is of such character that it will not or will oscillate accordingly as the circuit element undergoing test is in normal or defective condition. In another form of the invention illustrated, the oscillator arrangement is such that oscillations of one frequency or of a substantially different frequency occur accordingly as the impedance of the tested element is or is not relatively low.

In the preferred forms of the invention, an automatic switch mechanism, which may be of known commercially available type, is employed to operatively connect different measuring elements or circuits one at a time at predetermined intervals or rates to the testing apparatus.

The various features of novelty which characterize my invention are pointed out with particularity in the claim annexed to and forming a part of this specification. For a better understanding of the invention, however, its advantages, and specific objects attained with its use, reference should be had to the accompanying drawing and descriptive matter in which I have illustrated and described preferred embodiments of the invention.

Figure 1:
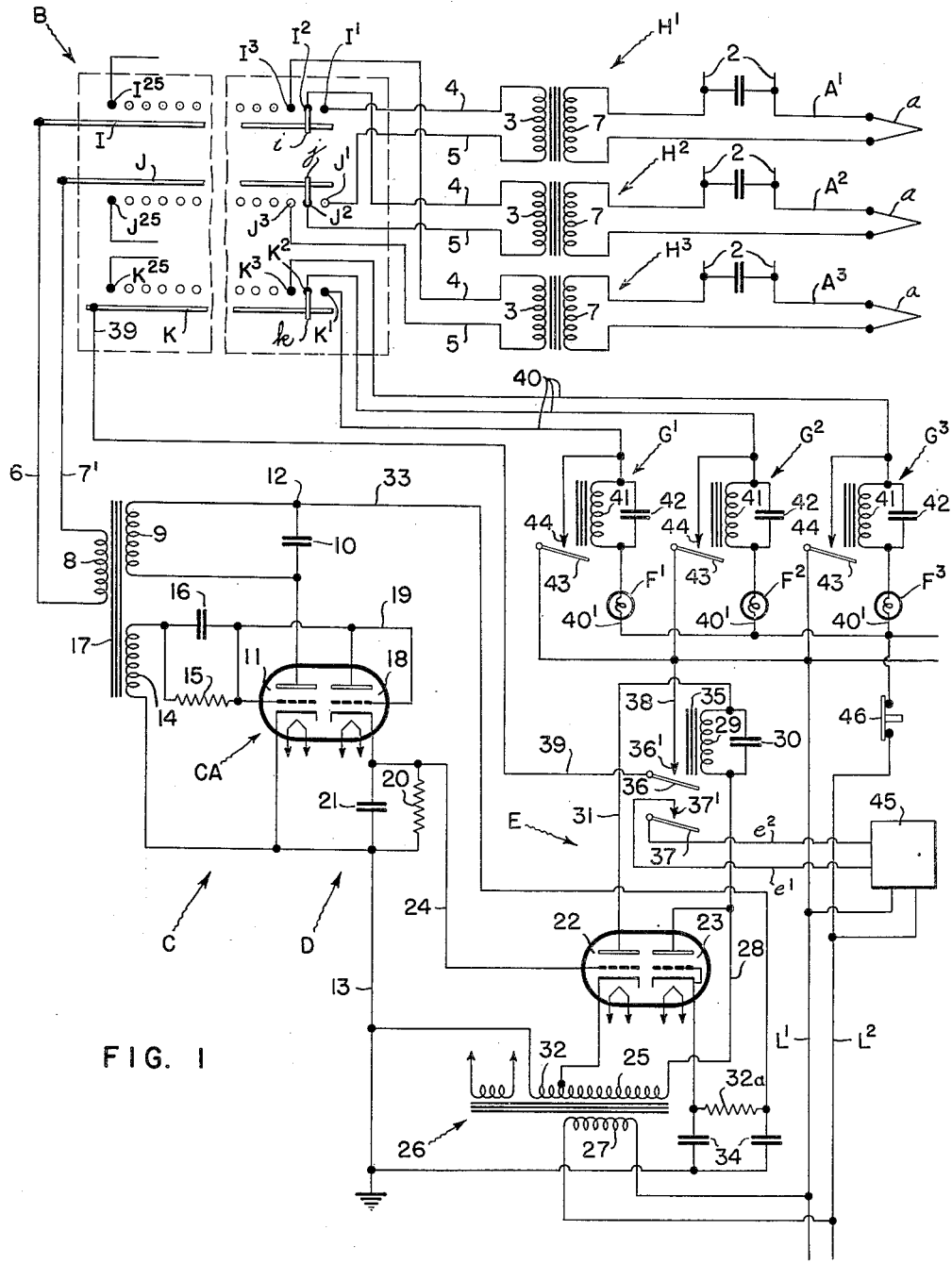
Fig. 1 is a diagram illustrating a preferred form of the present invention.

Fig. 1 diagrammatically illustrates, by way of example, an arrangement including a switch B for successively connecting a plurality of individual thermocouple circuits A1, A2, A3, etc., one at a time in regular succession in each of continuously recurring cycles, to a testing apparatus operative to determine whether the condition of each such element is normal or abnormal, and to identify each circuit element which is in a defective or abnormal condition and to provide continuous indication of the defective condition of the circuit element, without interrupting the regular successive testing operations of the testing apparatus. In the particular form shown, the testing apparatus includes an oscillator C and a detector D through which the oscillator actuates a relay controller E, whenever any particular thermocouple circuit, momentarily connected to the oscillator, is found to be defective. In the arrangement shown in Fig. 1, on the connection of a defective thermocouple circuit to the oscillator C, the relay controller E illuminates a signal lamp F1, F2, F3, etc., individual to the defective thermocouple circuit, and actuates an alarm circuit e, e'. As shown in Fig. 1, the illumination of any one of the signal lamp F1, F2, etc., energizes a corresponding hold-in relay G1, G2, G3, etc., for maintaining the illumination of the signal lamp after the switch mechanism B operates to disconnect the defective circuit element from the oscillator C and to connect another circuit element thereto.

As diagrammatically shown in Fig. 1, each of the thermocouple circuits A1, A2, etc., is connected to the switch B through an isolation transformer H1, H2 etc., individual to that thermocouple circuit. As shown, each isolation transformer has its secondary winding 1 included in the individual thermocouple circuit in series with the thermocouple a in that circuit, and with a measuring instrument which is not shown but may be connected between the branches 2 of the thermocouple circuit. As shown, the branches 2 of each thermocouple circuit are connected by a condenser to reduce the impedance of the circuit to the flow therein of alternating current induced by the corresponding one of the transformers H1, H2 etc. The primary winding 3 of each isolation transformer has its terminal leads 4 and 5, respectively, connected to an appropriate pair of contacts included in the switch B. As shown, the primary terminal leads 4 of the transformers H1, H2, H3 etc., are respectively connected to contacts I1, I2, I3 etc., and the primary terminal leads 5 of the transformers H1, H2, H3 etc., are respectively connected to contacts J1, J2, J3 etc.

As diagrammatically shown in Fig. 1, the contacts I1, I2, I3 etc. are arranged in a row and the contacts J1, J2, J3 etc., are arranged in a second row. Each of the two rows of contacts just mentioned includes an individual contact for each of the different thermocouple circuits A1, A2, A3 etc. In Fig. 1, it is assumed that there are 25 thermocouple circuits A1, A2, A3, etc., arranged for successive connection to the oscillator C, and I now consider 25 thermocouple circuits to be about the maximum number of circuits which it is practically feasible and desirable to associate with a single testing oscillator C. The switch mechanism B includes a third series of contacts K1, K2, K3, etc., respectively connected as hereinafter described with the signal lamps F1, F2, F3 etc., and relays G1, G2, G3 etc., respectively related to different thermocouple circuits A1, A2, A3, etc. In Fig. 1, the three sets of contacts I1, I2, I3 etc., J1, J2, J3 etc., and K1, K2, K3 etc., are shown diagrammatically as arranged in straight side by side rows.

Figure 3:
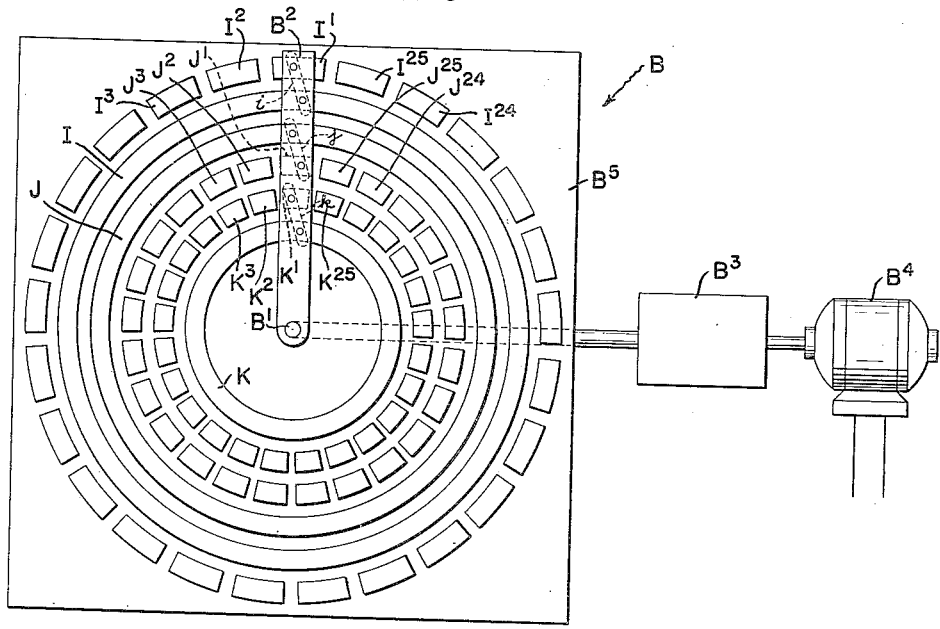
Fig. 3 is an elevation diagrammatically illustrating an automatic switch mechanism included in the apparatus shown in Fig. 1.

In ordinary practice, however, the contacts of each set are advantageously arranged in a circular row and the three circular rows of contacts are mounted concentrically on a common support as shown in Fig. 3. The switch mechanism B in the form shown diagrammatically in Fig. 3 comprises a contact supporting plate or body B5 of which the contacts I1, I2, I3, etc.; J1, J2, J3, etc.; and K1, K2, K3, etc., are arranged in concentric circles of different diameters surrounding and coaxial with a shaft B1 carrying a switch arm B2 and rotated in intermittent steps at the desired frequency by a mechanism B3 actuated by a synchronous motor B4. As diagrammatically shown, separate annular contacts I, J, and K are mounted on the support B5 to extend circularly about the shaft B1 adjacent the annular rows of contacts I1, I2, I3, etc.; J1, J2, J3, etc.; and K1, K2, K3, etc., respectively. The switch arm B2 carries a bridging contact i adapted to connect each of the contacts I1, I2, I3, etc., when in engagement therewith, to the annular contact I. The arm B2 also carries a bridging contact j which successively engages contacts J1, J2, J3, etc.; and connects each contact engaged to the annular contact J. Similarly the arm B2 carries a bridging contact k which successively connects the contacts K1, K2, K3, etc., to the annular contact K.

The switch contacts I and J are respectively connected by conductors 6 and 7 to the terminals of a coil 8 included in the oscillator C. At any instant, the coil 8 is thus connected in series with the primary winding of whichever of the thermocouple circuits A1, A2, A3, etc., then has the primary winding of its isolation transformer H1, H2, H3 etc., connected to the contacts I and J. The coil 8 is inductively coupled to a coil 9 which is connected in parallel with a condenser 10 between the anode of a triode 11 and a source 12 of anode voltage at a suitably high positive potential relative to the ground connection 13 to which the cathode of the valve 11 is connected. The coil 9 is also in inductive relation with a coil 14 included in the input circuit of the triode 11. As shown, the coil 14 is connected between the control grid and cathode of the valve 11, in series with a resistor 15 and a condenser 16 in parallel with said resistor. The coils 8, 9 and 14 are associated with a common iron core 17, so that the inductances of the coils are relatively high.

The inductively coupled coils 9 and 14 form a feed back connection between the output and input circuits of the valve 11, operative to maintain the latter in operation as a self-excited oscillator during periods in which the energy transferred by the coil 9 to the coil 8 is not great enough to overload the oscillator C and thus prevent its oscillation. When the thermocouple circuit under test is intact, the oscillator C cannot oscillate without creating an alternating current flow in the low impedance thermocouple circuit. The maintenance of that flow, and of the alternating current flow then necessarily maintained in the intermediate circuit including the isolation transformer coil 3 and coupling coil 8, requires an appreciable expenditure of energy.

As is well known in the art, a relatively low impedance circuit when coupled to an oscillator circuit, draws power from the latter, and by suitably proportioning the circuits, the low impedance circuit may be adapted to draw from the oscillator circuit enough power to prevent that circuit from oscillating, or a somewhat smaller amount of power sufficient to substantially reduce the oscillation frequency of the oscillator. For the purposes of the invention in the form shown in Fig. 1, each thermocouple circuit with its condenser 2 is operative when intact to draw enough power from the oscillator circuit to prevent oscillation of the latter.

The detector D is actuated by the oscillator C when the latter is in oscillation. As shown, the detector D comprises a valve 18 having an anode, a cathode, and a control grid, but its control grid is connected to the anode so that the valve 18 operates as a diode. The valves 11 and 18 are included in the same tube CA which advantageously is of the commercially available 7N7 type. The anode of the valve 18 is connected by conductor 19 to one terminal of the coil 14 through the grid resistor 15 and the condenser 16 in parallel therewith. The cathode of the valve 18 is connected to the grounded conductor 13 by a cathode resistor 20 and a condenser 21 in parallel therewith. When the device C is oscillating, the coil 14 supplies anode current to the valve 18 and energizes the latter.

The energization of the detector D actuates the relay controller E through triode valves 22 and 23 which may well be included in a twin tube of the 7N7 type. However, the control grid and cathode of the valve 23 are connected for operation of the valve as a diode. The control grid of the valve 22 is connected to the cathode of the valve 18 through a conductor 24. The output circuit of the valve 22 includes the secondary winding 25 of a transformer 26 which has its primary coil 27 connected across branches L1 and L2 of a circuit adapted to supply alternating current of commercial voltage and frequency, for example, 115 volts and 60 cycles per second. The secondary winding 25 has one terminal directly connected to the cathode of the valve 22 and has its second terminal connected to the anode of the valve 22 through a conductor 28, a coil 29 and condenser 30 in parallel therewith, and a conductor 31. The cathode of the valve 22 is connected to the grounded conductor 13 through a coil 32. The latter is a second secondary winding of the transformer 26, and operates to make the potential of said cathode sufficiently positive relative to ground to prevent the valve 22 from becoming operatively conductive except when the oscillator C is oscillating and the valve 18 is operating to rectify current supplied to it by the coil 14. The resultant increase in voltage of the cathode of valve 18 is transmitted by the conductor 24 to the control grid of the valve 22.

The valve 23 operates as a half wave diode rectifier to supply anode voltage to the valve 11. As shown, the anode of the valve 23 is connected through the conductor 28 to the terminal of the winding 25 not connected to the winding 32. The cathode of the valve 23 is connected through the resistance 32a and a conductor 33 to the previously mentioned terminal 12. The latter is connected for direct current flow through the coil 9 to the anode of the valve 11. The resistor 32 has its terminals connected to the grounded conductor 13 by condensers 34 which unite with said resistor to form a filter for smoothing out ripple in the rectified output of the rectifier 23.

The coil 29 is the energizing coil of an electromagnetic switch mechanism 35 which is included in and forms the operating mechanism of the relay controller E. When the valve 22 is conductive so that current flows through the coil 29, the switch mechanism 35 is energized to connect a movable contact 36 to a stationary contact 36' and to connect a movable contact 37 to a stationary contact 37'. The contacts 36 and 37 are biased for movement out of engagement with the contacts 36' and 37', respectively, when the coil 29 is de-energized. The movement of the contact 36 into engagement with the contact 36' closes the energizing circuit for whichever of the signal lamps F1, F2, F3, etc., pertains to the defective thermocouple circuit then connected through the coil 8 to the oscillator C. The lamp energizing circuit so closed comprises a conductor 38 connecting the stationary switch contact 36' to a supply conductor branch L1, a conductor 39 connecting the movable contact 36 to the contact K of the switch mechanism B, the bridging contact k, a conductor 40 connecting whichever of the contacts K1, K2, K3, etc., is then engaged by the contact k, to one terminal of the corresponding one of the lamps F1, F2, F3, etc., and a conductor 40' connecting the second terminal of the lamp to the supply circuit branch L2. The effect of the engagement of the contacts 36 and 36' is thus to connect one of the lamps F1, F2, F3, etc., across branches L1 and L2 of the alternating current supply system.

The conductor 40 associated with each of the lamps F1, F2, F3, etc., includes a coil 41 and condenser 42 in parallel therewith. Each coil 41 forms the energizing coil of a corresponding one of holding-in relay switch mechanisms G1, G2, G3, etc., respectively associated with the lamps F1, F2, F3, etc. When the coil 41 of any one of the holding in relays is energized, it moves a corresponding movable contact 43 into engagement with an associated stationary contact 44. Each of the contacts 43 is biased for movement out of engagement with the corresponding contact 44. Each contact 43 is connected to the supply conductor branch L1, and the corresponding contact 44 is connected to the associated conductor 40.

The energization of the coil 41 of any of the holding-in switch mechanisms, thus establishes a holding-in circuit for the corresponding lamp F1, F2, F3, etc., which maintains the illumination of the latter when the contact k is thereafter moved out of engagement with whichever of the contacts K1, K2, K3, etc., is included in the energizing circuit for said corresponding lamp. With the arrangement shown, each of the lamps F1, F2, F3, etc., when energized, remains energized until the lamp is manually de-energized. Such de-energization is ordinarily effected only when the defective thermocouple circuit has been replaced. As shown, the attendant may de-energize or extinguish the previously illuminated lamp or lamps, by opening a normally closed reset switch 46, included in the supply circuit branch L2 associated with the signal lamps F1, F2, F3, etc., and hold-in relays G1, G2, G3, etc.

The movement of the contact 37 into engagement with the contact 37' of the relay controller E connects circuit branches e1 and e2 and thereby closes an alarm circuit which is closed only when one or more of the thermocouple circuits A1, A2, A3, etc., is defective. The alarm circuit may include a distant visual or aural alarm device 45 of any usual or suitable form. The alarm circuit arrangement may be such that when the alarm 45 is energized it will remain energized until all of the thermocouple circuits are again in their normal condition.

The condenser 42 connected across each hold-in coil 41 provides protection against a spurious lamp indication of thermocouple circuit failure which might otherwise occur when the switch mechanism B operates to disconnect from the oscillator a thermocouple circuit which happens to be defective, and to connect to the oscillator a thermocouple circuit which is not defective. The intended operating result of the switching operation is the prompt quenching of the oscillation of the oscillator maintained while the defective thermocouple circuit was connected to the oscillator. However, the delay in the operation of the relay E due to the time constant (RC) of the relay winding 29 and condenser 30, and the inertia retarding the movement of the contact 36 out of engagement with the contact 36' may permit those contacts to remain in engagement long enough to momentarily energize the particular one of the lamps F1, F2, F3 etc., pertaining to the non-defective circuit newly connected to the testing circuit. The condenser 42 is provided to prevent the associated holding-in relay involved from making this false indication permanent.

It is believed that the operation of the apparatus collectively shown by Figs. 1 and 3, will be made apparent to those skilled in the art by the drawings and the foregoing portion of the specification. So long as any particular thermocouple circuit remains intact, it will prevent oscillation of the oscillator C when operatively coupled to the latter, and the corresponding one of the lamps F1, F2, F3, will remain dark. The various lamps F1, F2, F3, etc. are advantageously arranged in a single panel, so that an observer can see at a glance, which if any, of the various thermocouple circuits is defective. Whenever the thermocouple circuit connected to the oscillator C is broken or has an abnormally high impedance, the oscillator will oscillate and the corresponding one of the lamps F1, F2, F3, etc., will be illuminated. The apparatus shown in Figs. 1 and 3 is relatively simple and inexpensive to construct and operate. By a suitable selection or adjustment of the motor B4 and mechanism B3, the frequency of the testing operations may be varied as conditions may make desirable.

The testing of each of the different thermocouple or measuring circuits may be repeated in the use of the present invention, with whatever frequency seems practically desirable. The number of measuring devices or circuits, in each group tested by a single testing unit apparatus may vary with the character of the apparatus and the conditions of use. In the preferred form of testing apparatus shown in Fig. 1, the practical maximum number of measuring devices or circuits successively tested may well be about 25. In some cases successive testing operations are effected at the rate of one per second, but this rate may be increased several times when operating conditions make it desirable to so increase the frequency of the successive tests on each element. In general, the higher the testing frequency the greater the cost of manufacturing, operating and maintaining the testing apparatus, and in many cases the rate at which successive testing operations are effected may well be considerably lower than one per second.

Figure 2:
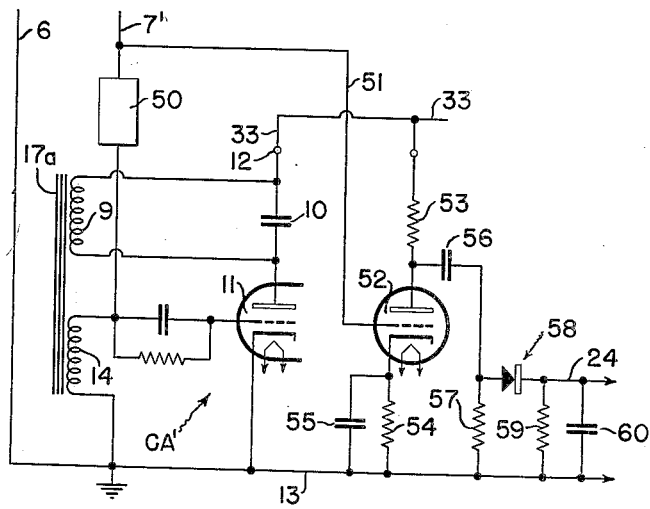
Fig. 2 is a diagram illustrating a modification of the arrangement shown in Fig. 1.

In Fig. 2, I have illustrated a modification in which the oscillator C of Fig. 1 is replaced by an oscillator CA' which is continuously in oscillation in normal operation, regardless of whether the thermocouple circuit connected to the oscillator is intact, or is broken. The transformer core 17a of Fig. 2 couples coils or windings 9 and 14 associated with the anode and cathode circuits of a valve 11 as in Fig. 1. However, the apparatus shown in Fig. 2 does not include a winding corresponding to the winding 8 of Fig. 1. In Fig. 2, conductors 6 and 7' which are connected to the switching mechanism B, as in Fig. 1, are directly connected by the coil or winding 14. Furthermore, the conductor 7' of Fig. 2 includes a potential dropping impedance 50.

In the arrangement shown in Fig. 2, the output voltage of the valve 11 is amplified by a buffer amplifier 52. The latter has its control grid connected to the conductor 7' between the impedance 50 and the switch mechanism B. As shown, the anode of the amplifier 52 is connected through a resistance 53 to the conductor 33 which supplies anode voltage for the valve 11, as in Fig. 1. The cathode of the valve 52 is connected to the grounded conductor 13 by a resistance 54 and condenser 55 in parallel therewith. The anode and cathode of the valve 52 are connected by means of a condenser 56 and a resistance 57 connected in series between the anode of the valve 52 and the grounded conductor 13. The amplified alternating output voltage of the valve 52 is rectified by a rectifier 58, shown as of the copper oxide type and having its anode connected to the anode of the valve 52 by the condenser 56, and having its cathode connected to ground by a resistance 59 and a condenser 60 in parallel therewith. The conductor 24 and the grounded conductor 13 form means through which the apparatus shown in Fig. 2 may be connected to and control the operation of a relay controller E and associated mechanism similar to the controller and mechanism connected to and controlled by the conductors 24 and 13 of Fig. 1.

In the operation of the apparatus illustrated in Fig. 2, the high frequency voltage impressed by the oscillator CA' on the circuit including the primary winding of whichever of the transformers H1, H2, H3 is then connected between the conductor 6 and 7', and the impedance 50, is divided across said primary winding and impedance. The voltage drop across the impedance 50 is greater when the thermocouple circuit connected to the oscillator is broken than when it is intact. In consequence, when a defective thermocouple circuit is connected to the oscillator CA', the resultant increase in the high frequency voltage drop across the impedance 50 increases the conductivity of the valve 52 and thus results in the effective energization of the relay valve 22 having its control grid connected to the conductor 24 of Fig. 2.

While a break in a thermocouple circuit undergoing test in the apparatus illustrated in Fig. 2 will operate the associated relay controller to produce operative effects like those produced in Fig. 1, when a break in the thermocouple circuit connected to the oscillator C permits the latter to oscillate, the apparatus shown in Fig. 1 has advantages over that illustrated in Fig. 2. For one thing the apparatus shown in Fig. 2, is open to the objection that with the oscillator CA' in continuous operation, high frequency current will flow in the thermocouple circuit coupled to the oscillator and will need to be filtered out if the thermocouple voltages are to be measured by electronic instruments, such as now in wide use for measuring thermocouple voltages. A further advantage which the apparatus shown in Fig. 1 has over the modification illustrated in Fig. 2, is that in the Fig. 1 apparatus the defective signal varies from zero to a maximum, when a broken or burned out thermocouple circuit is connected to the oscillator whereas, with the Fig. 2 arrangement, the signal variation is through a narrower range, since it is between maximum and a minimum which is definitely greater than zero. The wider range of variation obtainable with Fig. 1 is definitely preferable for the operation of an alarm system.

Notwithstanding their differences, both forms of the invention illustrated are alike in that each creates a relatively large signal when the thermocouple circuit connected to the test apparatus is defective. A large signal is practically desirable in apparatus used in rapidly testing the conditions of a plurality of thermocouples.

While in accordance with the provisions of the statutes. I have illustrated and described the best forms of embodiment of my invention now known to me, it will be apparent to those skilled in the art that changes may be made in the forms of the apparatus disclosed without departing from the spirit of my invention as set forth in the appended claim, and that in some cases certain features of my invention may be used to advantage without a corresponding use of other features.

Having now described my invention, what I claim as new and desire to secure by Letters Patent, is:

Automatic mechanism for successively testing a group of measuring elements so that each element is tested at regular intervals, comprising testing mechanism, periodically operating switching mechanism arranged to successively connect said elements one at a time to said testing mechanism in regularly repeated cycles, indicating means including a separate indicating device and a separate hold in relay associated with each element, a second switching mechanism, means included in said testing mechanism and arranged to operatively connect the last mentioned switching mechanism to said testing mechanism when the latter detects an abnormal condition of the element being tested, means actuated by said second switching mechanism when the latter is operated by said testing mechanism to energize the indicating device and the hold in relay which are associated with the last mentioned element, and circuit means through which said second switching mechanism when so operated connects the last mentioned hold in relay to a source of energizing current.

LEONARD STANTON.

REFERENCES CITED

The following references are of record in the file of this patent:

UNITED STATES PATENTS

| Number | Name | Date |
|---|---|---|
| 1,977,703 | Swartwout | Oct. 23, 1934 |
| 2,104,441 | Stratford | Jan. 4, 1938 |
| 2,459,801 | Fahrner | Jan. 25, 1949 |
| 2,478,945 | Rose | Aug. 16, 1949 |
| 2,488,556 | Parmenter | Nov. 22, 1949 |

FOREIGN PATENTS

| Number | Country | Date |
|---|---|---|
| 612,362 | Great Britain | Nov. 11, 1948 |